United States Patent
Shih

(10) Patent No.: US 12,363,402 B2
(45) Date of Patent: Jul. 15, 2025

(54) IMAGING SYSTEM FOR PROVIDING HIGH RESOLUTION RATIO OF IMAGES UNDER LOW COST, IMAGING METHOD, AND COMPUTER READABLE STORAGE MEDIUM THEREOF

(71) Applicant: TRIPLE WIN TECHNOLOGY(SHENZHEN) CO.LTD., Shenzhen (CN)

(72) Inventor: Cheng-Yuan Shih, New Taipei (TW)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 167 days.

(21) Appl. No.: 18/221,442

(22) Filed: Jul. 13, 2023

(65) Prior Publication Data

US 2024/0373108 A1    Nov. 7, 2024

(30) Foreign Application Priority Data

May 5, 2023   (CN) .......................... 202310499315.4

(51) Int. Cl.
*H04N 23/11*      (2023.01)
*G06T 5/10*       (2006.01)
*G06T 5/20*       (2006.01)

(52) U.S. Cl.
CPC .............. *H04N 23/11* (2023.01); *G06T 5/10* (2013.01); *G06T 5/20* (2013.01); *G06T 2207/10048* (2013.01)

(58) Field of Classification Search
CPC ... G06T 2207/10048; G06T 7/33; G06T 5/50; G06T 2207/20084; G06T 5/70; G06T 7/11; G06T 2207/10024; G06T 2207/20221; G06T 2207/10032; H04N 25/671; H04N 23/11; H04N 25/76; H04N 23/45; H04N 23/80; H04N 23/57; H04N 23/13; H04N 5/262; H04N 5/265; H04N 23/23

(Continued)

(56) References Cited

U.S. PATENT DOCUMENTS

| 2006/0208169 A1* | 9/2006 | Breed | ..................... G01S 15/88 250/221 |
| 2015/0334315 A1* | 11/2015 | Teich | ........................ G06T 7/90 348/164 |
| 2019/0141261 A1* | 5/2019 | Högasten | ............. H04N 13/243 |

FOREIGN PATENT DOCUMENTS

CN    104021532 A  *  9/2014

* cited by examiner

*Primary Examiner* — Masum Billah
(74) *Attorney, Agent, or Firm* — ScienBiziP, P.C.

(57) ABSTRACT

An imaging system for providing high resolution ratio of images under a low cost includes a visible light image module, an infrared image module, and a processor. The visible light image module generates a visible light image. The infrared image module generates an infrared image. The processor executes following processes: acquiring a visible light image and an infrared image; transforming the visible light image and the infrared image into visible light image spectrum information and infrared image spectrum information respectively; acquiring high frequency information from the visible light image spectrum information; merging the high frequency information and the infrared image spectrum information to obtain merged image spectrum information; and transforming the merged image spectrum information into a merged image. An imaging method and a computer readable storage medium are also disclosed.

20 Claims, 9 Drawing Sheets

(58) Field of Classification Search
USPC .......................................................... 348/164
See application file for complete search history.

IMAGING SYSTEM FOR PROVIDING HIGH RESOLUTION RATIO OF IMAGES UNDER LOW COST, IMAGING METHOD, AND COMPUTER READABLE STORAGE MEDIUM THEREOF

FIELD

The subject matter herein generally relates to image processing technology, and particular to an imaging system for providing high resolution ratio of images under a low cost, an imaging method, and a computer readable storage medium thereof.

BACKGROUND

Thermal sensors are widely used in a temperature measure of objects. The objects generate Long-Wave Infrared Radiation (LWIR), and a waveband of the LWIR belongs to an invisible waveband. The thermal sensors sense the LWIR of the object to measure a temperature of the object. The thermal sensors are divided into thermal sensors with high-resolution ratio and thermal sensors with low-resolution ratio. The thermal sensors with the high-resolution ratio use special materials and are manufactured in specific procedure, which cause a cost to be high. A cost of the thermal sensors with the low-resolution ratio is low, but a recognition of an infrared image generated by the thermal sensors with the low-resolution ratio is low, which is hard to satisfied with user's requirements.

There is room for improvement in the art.

BRIEF DESCRIPTION OF THE DRAWINGS

Implementations of the present disclosure will now be described, by way of example only, with reference to the attached figures.

DETAILED DESCRIPTION

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements.

It should be understood that, in this embodiment of the present disclosure, "at least one" means one or more, and "a plurality of" means two or more. The term "and/or" is used to describe an association relationship for describing associated objects, and indicates that three relationships may exist. For example, "A and/or B" may represent the following three cases: Only A exists, only B exists, and both A and B exist, where A and B may be singular or plural. In the specification, claims, and accompanying drawings of the present disclosure, the terms "first", "second", "third", "fourth", and so on are intended to distinguish between similar objects but are not intended to indicate specific order or a sequence.

In addition, it should be noted that the methods disclosed in the embodiments of the present disclosure or the methods shown in the flowcharts include one or more blocks for implementing the methods, and the one or more blocks are not deviated from the scope of the claims. The order of execution can be interchanged with each other, and some of the one or more blocks can also be deleted.

Figure 1:
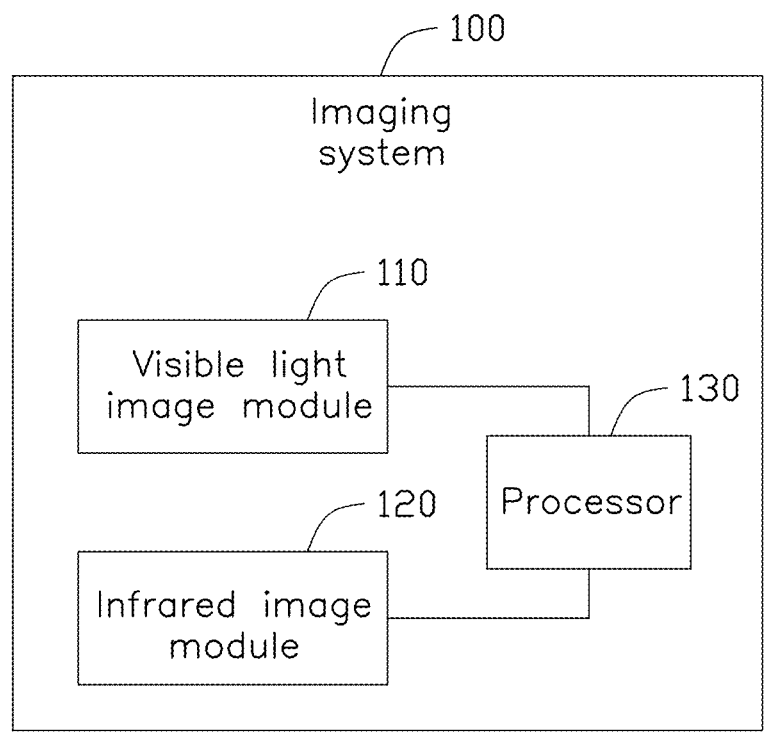
FIG. 1 is a diagram illustrating a first embodiment of an imaging system according to the present application.

FIG. 1 shows a diagram of an embodiment of an imaging system of the present disclosure.

Referring to FIG. 1, the imaging system 100 includes a visible light image module 110, an infrared image module 120, and a processor 130. The processor 130 connects with the visible light image module 110 and the infrared image module 120.

The visible light image module 110 is configured to generate a visible light image. In detail, the visible light image module 110 collects visible light reflected by an object and performs a sensitization process to generate the visible light image. The visible light image is a reflection image including full and detail features and is able to reflect a real scene.

The visible light image module 110 includes a visible sensor, a visible camera, and so on, but is not limited.

The infrared image module 120 is configured to generate an infrared image. In detail, the infrared image module 120 senses infrared radiation generated by the object and performs a sensitization process to generate the infrared image. The infrared image is a radiation image. A image gray scale is determined by a temperature difference between a target and a background. The infrared image includes less detail features of the target or the background and is unable to reflect the real scene.

The infrared image module 120 includes a thermal sensor, a thermal camera, an infrared ray (IR) sensor, and an IR camera, and so on, but is not limited.

The processor 130 is configured to implement following operations: acquiring the visible light image from the visible light image module 110 and the infrared image from the infrared image module 120 respectively; transforming the visible light image into visible light image spectrum information of the and transforming the infrared image into infrared image spectrum information; acquiring high frequency information from the visible light image spectrum information; merging the high frequency information and the infrared image spectrum information to obtain merged image spectrum information; and transforming the merged image spectrum information into a merged image.

The visible light image spectrum information corresponds to visible light information. The visible light includes the detail features of the visible light image. The detail features correspond to the high frequency information in the visible light image spectrum information. The high frequency information represents high frequency components in the visible light image spectrum information. The infrared image spectrum information corresponds to temperature information, the temperature information includes temperature distribution of the infrared image.

In one embodiment, the processor 130 transforms the acquired visible light image and the acquired infrared image into the visible light image spectrum information and the infrared image spectrum information respectively, acquires the high frequency information from the visible light image spectrum information, merges the high frequency information and the infrared image spectrum information to generate the merged image spectrum information, and lastly transforms the merged image spectrum information into the merged image. Thus, the merged image includes the temperature distribution of the infrared image and the detail features of the visible light image. The temperature distribution of the infrared image is obtained by the low-cost thermal sensor with a low-resolution ratio, and the detail features of the visible light image are features with high-resolution ratio, thus a recognition of the merged image is high, and it is benefit for satisfying with requirements in a low cost and a high-resolution ratio.

The processor 130 may include one or more processing units. For example. The processor 130 may include, but not limited to, an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be separate components or integrated in one or more processors.

The processor 130 also may also be provided with a memory for storing instructions and data. In some embodiments, the memory in the processor 130 is a cache memory. The memory may store instructions or data created or used or recycled by the processor 130. If the processor 130 needs to use the instructions or data again, it can be called up directly from the memory.

It is understood that the structure shown in this embodiment of the present technology does not constitute a specific limitation on the imaging system 100. In some other embodiments of this application, the imaging system 100 may include more or fewer components than those shown in the figure, or combine some components, or split some components, or have different component arrangements. The components shown in the figure may be implemented by hardware, software, or a combination of software and hardware.

In one embodiment, the visible light image spectrum information, the infrared image spectrum information, and the merged image spectrum information are frequency domain information, and the merged image is a spatial domain information. The frequency domain information is a frequency domain distribution of image features. The spatial domain information is a spatial domain distribution of the image features. The frequency domain and the spatial domain may be transformed between each other.

In another embodiment, for transforming the acquired visible light image and the acquired infrared image into the visible light image spectrum information and the infrared image spectrum information respectively, the processor 130 uses Fourier Transform (FT) for transforming the visible light image and the infrared image into the frequency domain respectively to obtain the visible light image spectrum information and the infrared image spectrum information.

In this embodiment, the processor 130 uses the FT to transform the visible light image and the infrared image into the frequency domain respectively, thus the visible light information included in the visible light image in the spatial domain is transformed into the visible light image spectrum information, the temperature information included in the infrared image in the spatial domain is transformed into the infrared image spectrum information in the frequency domain.

It is understood that, in other embodiments, the processor 130 may uses Fast Fourier Transform (FFT), Discrete Fourier Transform (DFT), or Wavelet Transform (WT), and so on, for transforming the visible light image and the infrared image into the frequency domain respectively.

In another embodiment, for transforming the merged image spectrum information into the merged image, the processor 130 use Inverse Fourier Transform (IFT) for transforming the merged image spectrum information in the frequency domain into the spatial domain to obtain the merged image.

In this embodiment, the processor 130 uses the IFT for transforming the merged image spectrum information in the frequency domain into the spatial domain, thus the merged image spectrum information in the frequency domain is transformed into merged information of the merged image in the spatial domain. The merged information includes the visible light information and the temperature information.

It is understood that, in other embodiments, the processor 130 may uses Inverse Fast Fourier Transform (IFFT), Inverse Discrete Fourier Transform (IDFT), or Inverse Wavelet Transform (IWT), and so on, for transforming the merged image spectrum information in the frequency domain into the spatial domain.

In other embodiments, for acquiring the high frequency information from the visible light image spectrum information, the processor 130 acquires the high frequency information from the visible light image spectrum information corresponding to a predefined frequency bandwidth.

The predefined frequency bandwidth may be set due to requirements. For example, the predefined frequency bandwidth may be set at 100 line pair per mm (lp/mm), 200 lp/mm, or 500 lp/mm, and so on.

In one embodiment, the processor 130 may adjusts the predefined frequency bandwidth for acquiring the corresponding high frequency information. The predefined frequency bandwidth corresponds to the high frequency information in the visible light image spectrum information. For example, it is supposed that the predefined frequency bandwidth is set at 100 lp/mm, the high frequency information is the spectrum information being larger than or equal to 100 lp/mm. When the predefined frequency bandwidth is set at 200 lp/mm, the corresponding high frequency information is adjusted to the spectrum information being larger than or equal to 200 lp/mm.

It is understood that, different high frequency information may be merged with the infrared image spectrum information to obtain corresponding merged image spectrum information for generating the corresponding merged images.

Figure 2A:
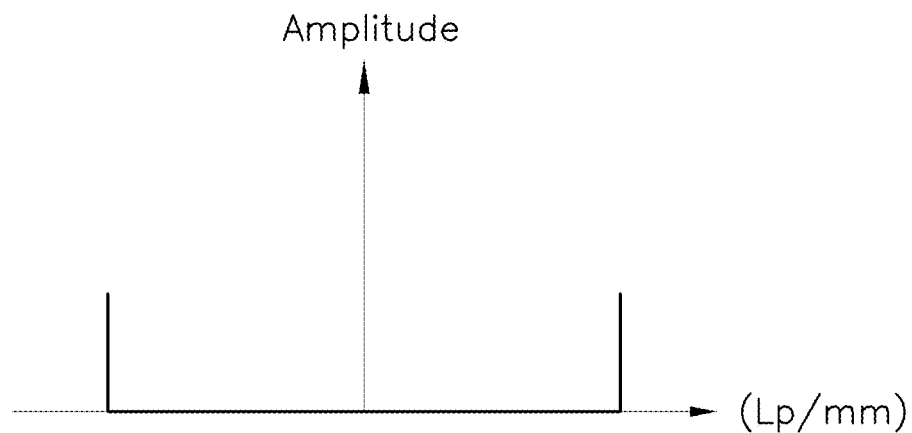
FIG. 2A is a diagram illustrating an embodiment of a predefined frequency bandwidth in a stop band according to the present application.
Figure 2B:
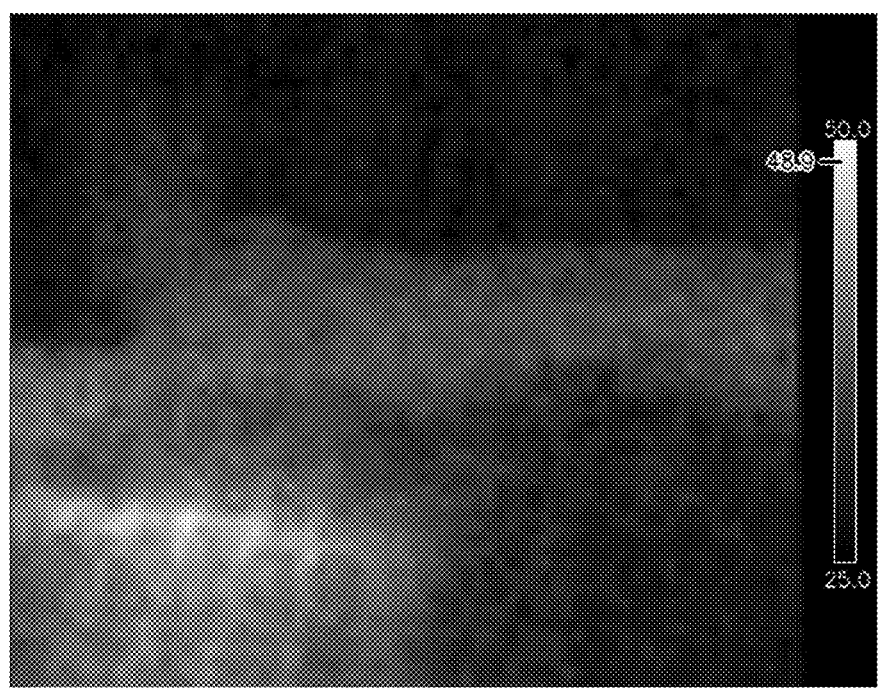
FIG. 2B is a diagram illustrating an embodiment of a merged image corresponding to the stop band according to the present application.

For example, when the predefined frequency bandwidth is a stop band, the high frequency components and low frequency components in the visible light image spectrum information are filtered. Meanwhile, the visible light image spectrum information is filtered, the merged image spectrum information is almost the same as the infrared image spectrum information, and the merged image is almost the same as the infrared image. For example, as shown in FIGS. 2A and 2B, FIG. 2A shows the provided stop band as an example, FIG. 2B shows the provided merged image corresponding to the stop band as an example. As shown in FIG. 2B, an imaging effect of the merged image corresponding to the stop band is blurry, the image recognition is low due to the lack of the detail features corresponding to the high frequency information.

Figure 3A:
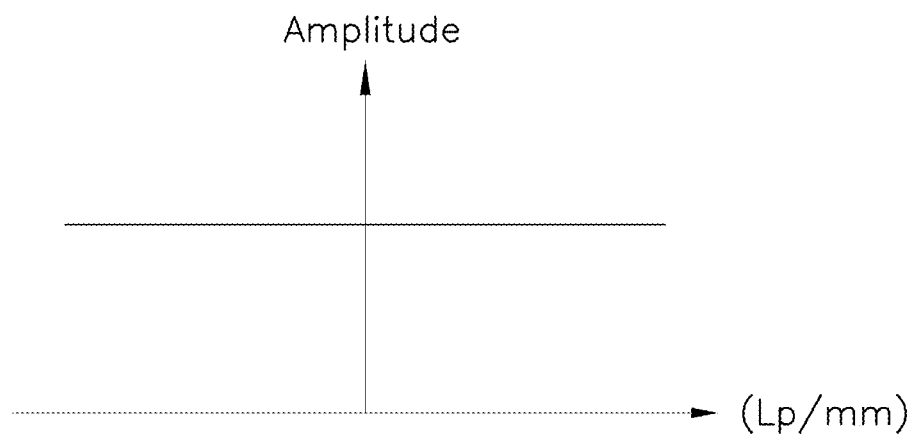
FIG. 3A is a diagram illustrating an embodiment of a predefined frequency bandwidth in a full pass band according to the present application.
Figure 3B:
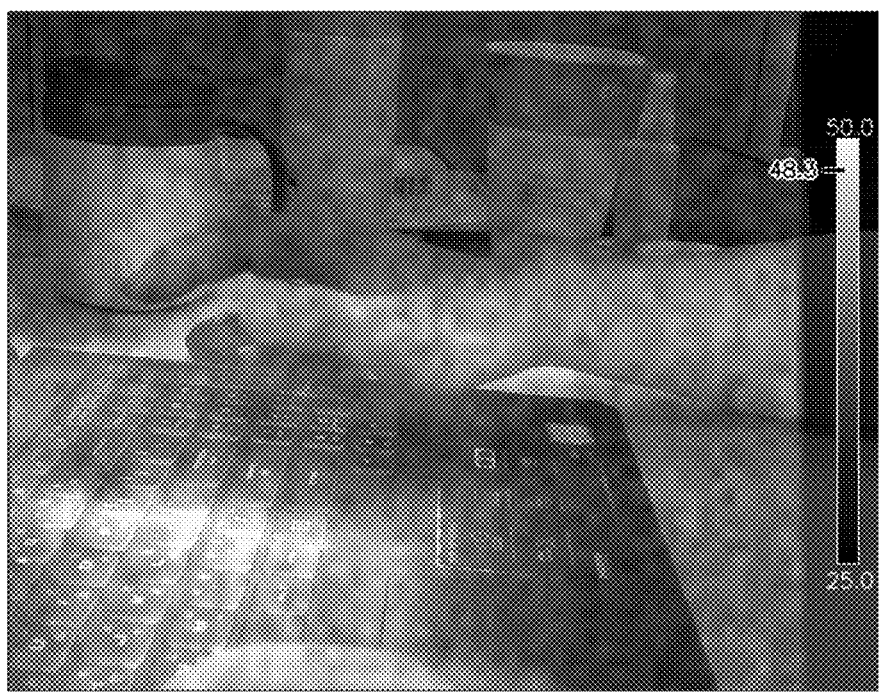
FIG. 3B is a diagram illustrating an embodiment of a merged image corresponding to the full pass band according to the present application.

When the predefined frequency bandwidth is a full pass band, the high frequency components and low frequency components in the visible light image spectrum information are retained. Meanwhile, the visible light image spectrum information is merged with the infrared image spectrum information, the merged image spectrum information includes the visible light image spectrum information and the infrared image spectrum information, therefore the merged image is an image adding by the visible light image and the infrared image. For example, as shown in FIGS. 3A and 3B, FIG. 3A shows the provided full pass band as an example, FIG. 3B shows the provided merged image corresponding to the full pass band as an example. As shown in FIG. 3B, an imaging effect of the merged image corresponding to the full pass band is clear, the image recognition is high due to the merged image including the detail features corresponding to the high frequency information. However, due to the merged image including all information of the visible light image spectrum information, it causes the merged image to improve a resolution ration of the infrared image and also contain the features not seen in the infrared image. Due to a user's requirement of improving the resolution and recognizability of the infrared image, some features not seen in the infrared image are needless to the users, which cause that the merged image does not meet the user's requirements.

Figure 4A:
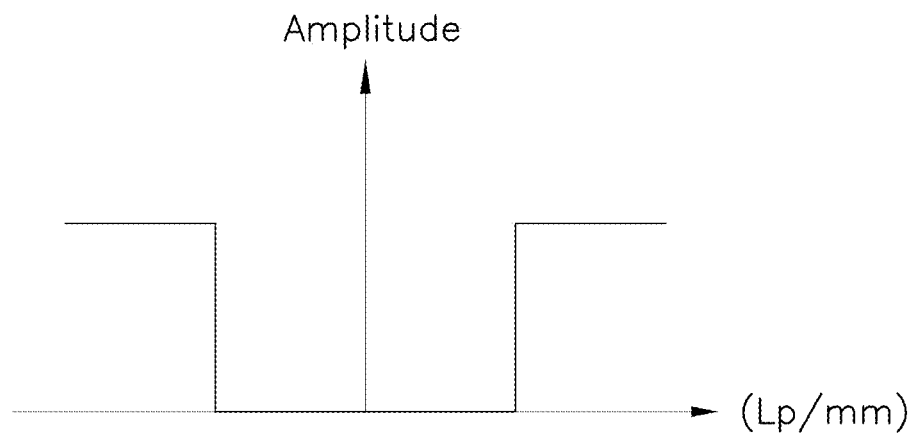
FIG. 4A is a diagram illustrating an embodiment of a predefined frequency bandwidth in a pass band according to the present application.
Figure 4B:
FIG. 4B is a diagram illustrating an embodiment of a merged image corresponding to the pass band according to the present application.

When the predefined frequency bandwidth is between the stop band and the full pass band, the high frequency components in the visible light image spectrum information is retained, and the low frequency components in the visible light image spectrum information is filtered. Meanwhile, the visible light image spectrum information is merged with the infrared image spectrum information, the merged image spectrum information includes the visible light image spectrum information and the infrared image spectrum information, thus the merged image merely provides the resolution of the infrared image. For example, as shown in FIGS. 4A and 4B, FIG. 4A shows the provided pass band as an example, FIG. 4B shows the provided merged image corresponding to the pass band as an example. As shown in FIG. 4B, the imaging effect of the merged image corresponding to the pass band is clear, the image recognition is high due to the merged image including the detail features corresponding to the high frequency information. Due to the low frequency components in the visible light image spectrum information is filtered, a shape of the merged image is almost the same as the infrared image, the merged image merely improves the resolution and recognizability of the infrared image.

In another embodiment, the processor 130 includes a high-pass filter. The high-pass filter is configured to acquire the high frequency information from the visible light image spectrum information corresponding to a predefined frequency bandwidth.

In one embodiment, the predefined frequency bandwidth of the high-pass filter may be adjusted. The processor 130 acquires the corresponding high frequency information by adjusting the predefined frequency bandwidth of the high-pass filter. For example, when the processor 130 adjusts the predefined frequency bandwidth of the high-pass filter to be equal to 50% of a largest bandwidth, the corresponding high frequency information is the spectrum information being larger than or equal to the 50% of the largest bandwidth.

In one embodiment, the processor 130 convolves a filter function of the high-pass filter with a Gaussian function to update the filter function of the high-pass filter.

Figure 5A:
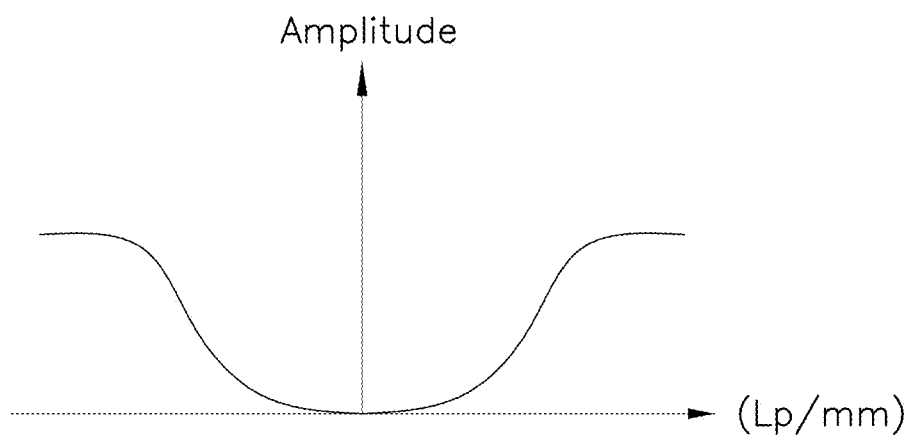
FIG. 5A is a diagram illustrating an embodiment of a filter function of a high-pass filter being convolved with a Gaussian function according to the present application.
Figure 5B:
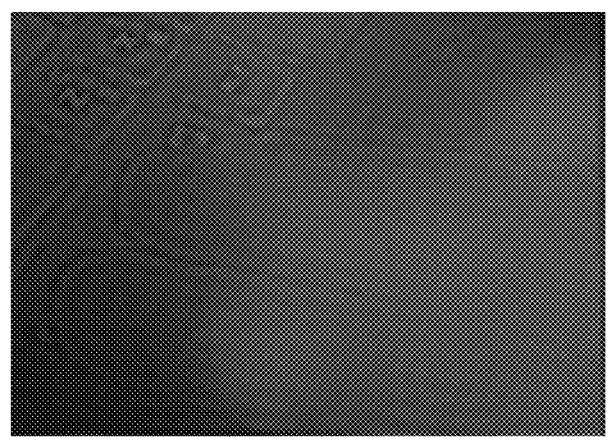
FIG. 5B is a diagram illustrating an embodiment of a partial image of a merged image with ringing artifact according to the present application.
Figure 5C:
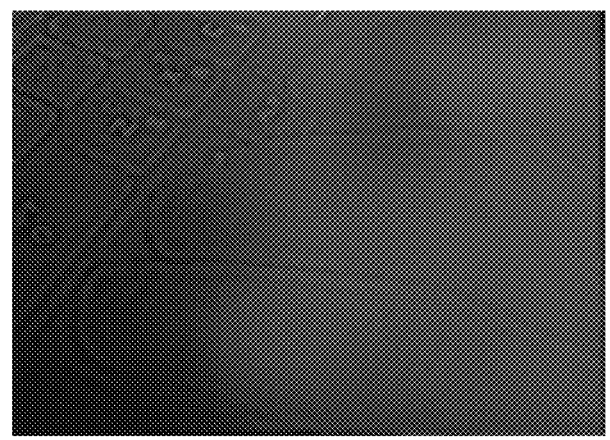
FIG. 5C is a diagram illustrating an embodiment of a partial of a merged image with the ringing artifact being suppressed according to the present application.

In this embodiment, an ideal high-pass filter will generate distortion while FT. After being IFT, it causes a ringing artifact generated at edge details of the merged image. The processor 130 convolves the filter function of the high-pass filter in the frequency domain with the Gaussian function, thus edges of the filter function is smooth, and it is beneficial to suppress the ringing artifact in the merged image. For example, as shown in FIGS. 5A, 5B, and 5C, FIG. 5A shows the provided filter function of the high-pass filter being convolved with the Gaussian function, FIG. 5B shows a provided partial image of the merged image with ringing effect, and FIG. 5C shows the provided partial image of the merged image with the ringing artifact being suppressed. After the filter function of the high-pass filter being updated by the processor 130, the edge details of the partial image of the merged image shown in FIG. 5C is smoother by comparing with the partial image of the merged image shown in FIG. 5B.

It is understood that, in other embodiments, the high-pass filter may be a Butterworth high-pass filter. Due to features of the filter function in the Butterworth high-pass filter, the ringing artifact may not be generated.

In another embodiment, the processor 130 includes an amplifier. The amplifier is configured to enhance the high frequency information.

Figure 6A:
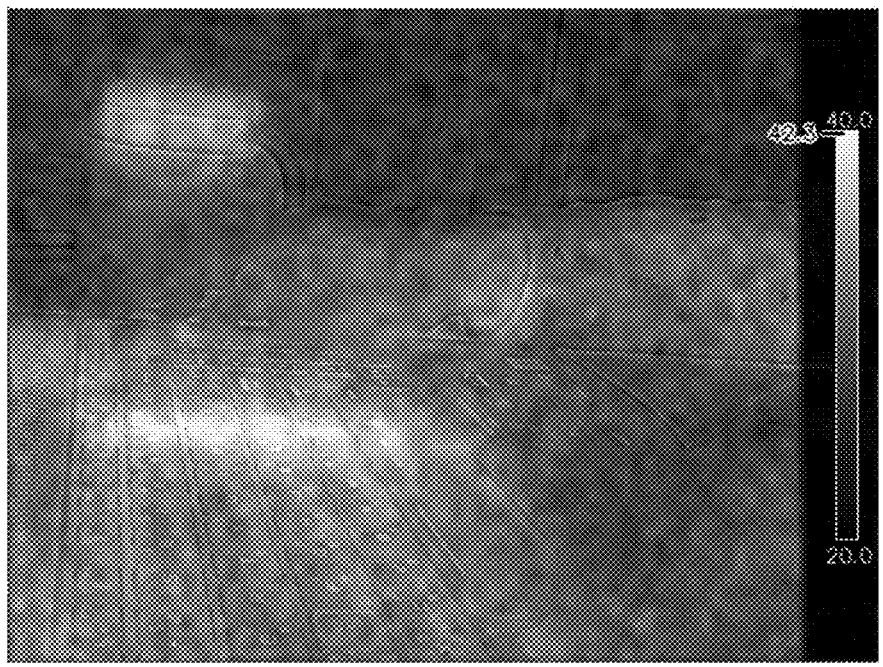
FIG. 6A is a diagram illustrating an embodiment of a merged image corresponding to a gain coefficient at 0.5 according to the present application.
Figure 6B:
FIG. 6B is a diagram illustrating an embodiment of a merged image corresponding to a gain coefficient at 2 according to the present application.

In one embodiment, a gain coefficient of the amplifier is adjustable. The processor 130 enhances the high frequency information by adjusting the gain coefficient of the amplifier, thus detail features included in the merged image are even more highlighted. There is positive correlation between the gain coefficient of the amplifier and an enhancement degree of the high frequency information. For example, as shown in FIGS. 6A and 6B, FIG. 6A shows the merged image corresponding to the gain coefficient at 0.5, and FIG. 6B shows the merged image corresponding to the gain coefficient at 2. Due to the increase of the gain coefficient of the amplifier, the detail features of the merged image shown in FIG. 6A is more highlighted by comparing with the merged image shown in FIG. 6B, therefore the recognition of the image is higher.

In another embodiment, the processor 130 includes a pre-processing module. The pr-processing module is configured to pre-process the acquired visible light image.

It is understood that, the operation of pre-processing incudes cartoonlization process, gray scale process, size transformation, histogram enhancement, spatial domain filter, image segmentation, edge detection, but is not limited. The edge detection may use Sobel operator, LoG operator, or Canny operator, and so on.

In one embodiment, the pre-processing manner may be set as requirements. For example, the pre-processing module may gray scale processes the acquired visible light image, it is benefit for simplifying a complexity of acquiring the high frequency information and improving a computation efficiency. For another example, the pre-processing module detects edges of the acquired visible light image, it is benefit for highlighting edge details of the image.

In another embodiment, the processor 130 includes a perspective projecting module. The perspective projecting module is configured to execute a perspective projection transformation to the acquired infrared image.

In this embodiment, the perspective projecting module executes the perspective projection transformation to the acquired infrared image for transforming a view angle of the acquired infrared image to be similar to a view angle of the visible light image, thus it is benefit for image merging.

Figure 7:
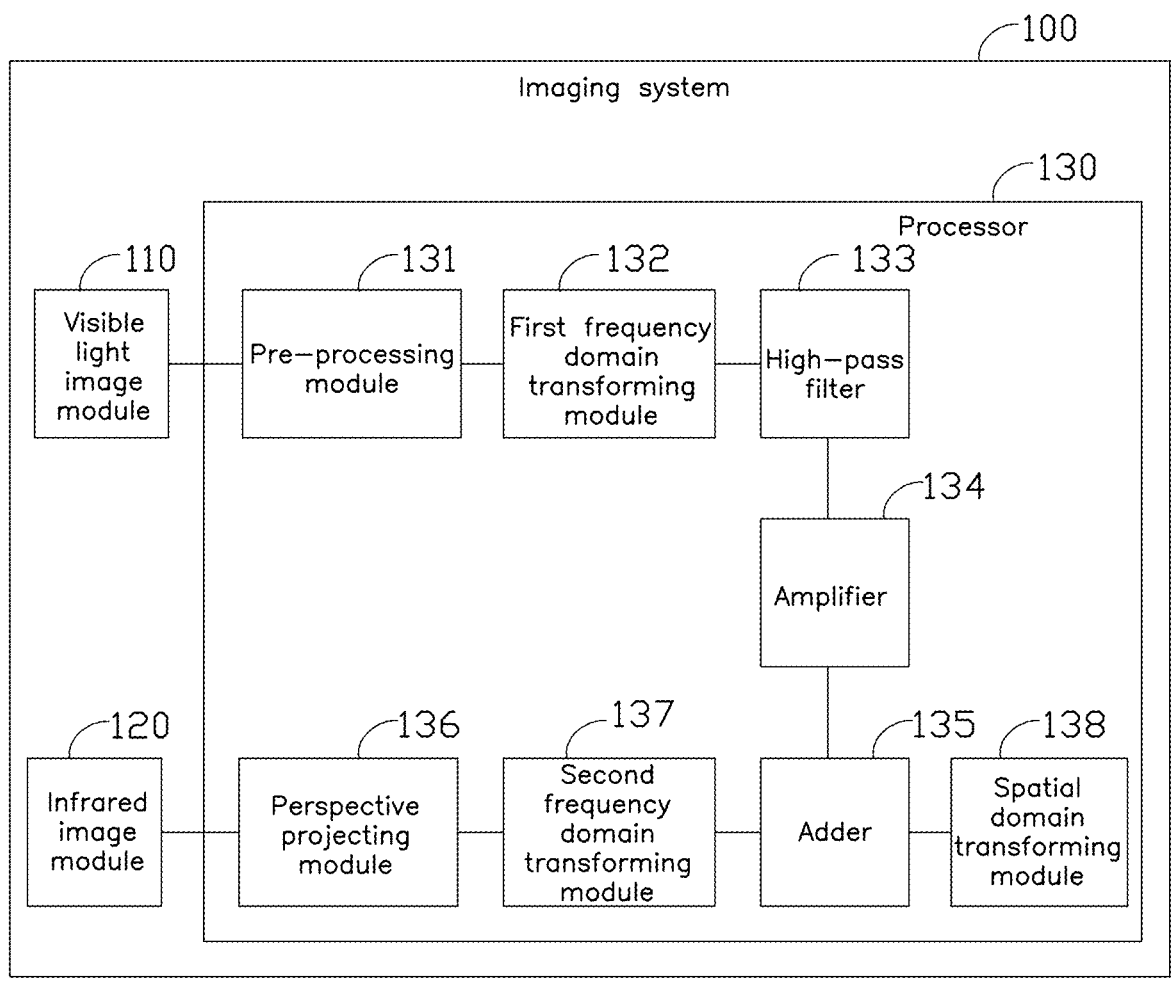
FIG. 7 is a diagram illustrating a second embodiment of an imaging system according to the present application.

FIG. 7 shows a second embodiment of the imaging system 100.

Referring to FIG. 7, the imaging system 100 includes a visible light image module 110, an infrared image module 120, and a processor 130. The processor 130 includes a pre-processing module 131, a first frequency domain transforming module 132, a high-pass filter 133, an amplifier 134, an adder 135, a perspective projecting module 136, a second frequency domain transforming module 137, and a spatial domain transforming module 138.

The pre-processing module 131 is connected between the visible light image module 110 and the first frequency domain transforming module 132. The pre-processing module 131 is configured to receive the visible light image from the visible light image module 110, pre-process the received visible light image, and transmit the pre-processed visible light image to the first frequency domain transforming module 132.

The first frequency domain transforming module 132 is further connected to the high-pass filter 133. The first frequency domain transforming module 132 is configured to receive the pre-processed visible light image from the pre-processing module 131, transform the pre-processed visible light image from the spatial domain into the frequency domain to obtain the visible light image spectrum information, and transmit the visible light image spectrum information to the high-pass filter 133.

The high-pass filter 133 is further connected to the amplifier 134. The high-pass filter 133 is configured to receive the visible light image spectrum information from the first frequency domain transforming module 132, acquire the high frequency information from the visible light image spectrum information, and transmit the high frequency information to the amplifier 134.

The amplifier 134 is further connected to the adder 135. The amplifier 134 is configured to receive the high frequency information from the high-pass filter 133, enhance the high frequency information, and transmit the enhanced high frequency information to the adder 135.

The perspective projecting module 136 is connected between the infrared image module 120 and the second frequency domain transforming module 137. The perspective projecting module 136 is configured to receive the infrared image from the infrared image module 120, execute a perspective projecting transformation to the received infrared image, and transmit the infrared image after being perspective projecting transformed to the second frequency domain transforming module 137.

The second frequency domain transforming module 137 is further connected to the adder 135. The second frequency domain transforming module 137 is configured to receive the infrared image after being perspective projecting transformed, transform the infrared image after being perspective projecting transformed from the spatial domain into the frequency domain to obtain the infrared image spectrum information, and transmit the infrared image spectrum information to the adder 135.

The adder 135 is further connected to the spatial domain transforming module 138. The adder 135 is configured to receive the enhanced high frequency information from the amplifier 134 and the infrared image spectrum information from the second frequency domain transforming module 134, merge the enhanced high frequency information and the infrared image spectrum information to obtain the merged spectrum information, and transmit the merged spectrum information to the spatial domain transforming module 138.

The spatial domain transforming module 138 is configured to receive the merged spectrum information from the adder 135, transform the merged spectrum information from the frequency domain into the spatial domain to obtain the merged image.

In one embodiment, by adjusting the pre-processing manner of the pre-processing module 131, the predefined frequency bandwidth of the high-pass filter 133 in the frequency domain, and the gain coefficient of the amplifier 134, the corresponding merged image spectrum information is obtained for generating the corresponding merged image.

For example, when the pre-processing manner of the pre-processing module 131 is cartoonlization process, the predefined frequency bandwidth of the high-pass filter 133 in frequency domain is the full pass band, and the gain coefficient of the amplifier 134 is at A1, the merged image spectrum information includes all information of the visible light image spectrum information and the infrared image spectrum information, the merged image is the image added by the Cartoonlike visible light image and the infrared image.

When the pre-processing manner of the pre-processing module 131 is edge detection, the low frequency components in the visible light image spectrum information in the spatial domain is filtered, the visible light image spectrum information merely includes the high frequency information, thus the merged image spectrum information includes the high frequency information and the infrared image spectrum information, the shape of the merged image is similar to the shape of the infrared image for improving the resolution and recognizability of the infrared image.

When the predefined frequency bandwidth of the high-pass filter 133 is 70% of the largest bandwidth, the low frequency components in the visible light image spectrum information in the spatial domain is filtered, the visible light image spectrum information merely includes the high frequency information, thus the merged image spectrum information includes the high frequency information and the infrared image spectrum information, the shape of the merged image is similar to the shape of the infrared image for improving the resolution and recognizability of the infrared image.

When the gain coefficient of the amplifier 134 is at A2, which is larger than A1, the high frequency information in the visible light image spectrum information is enhanced, the detail features of the merged image are even more highlighted.

In the above embodiments, the acquired visible light image and the infrared image are transformed into the visible light image spectrum information and the infrared image spectrum information, the high frequency information from the visible light image spectrum information is acquired, the high frequency information and the infrared image spectrum information are merged to generate the merged image spectrum information, lastly the merged image spectrum information is transformed into the merged image. Therefore, the merged image includes both the temperature distribution of the infrared image and the detail features of the visible light image, the temperature distribution of the infrared image is obtained by a low-cost thermal sensor with low-resolution ratio, the detail features of the visible light image are features in high-resolution ratio, which cause the merged image in a higher degree of recognition, it is benefit for satisfying the requirements in a low cost and a high resolution ration.

Figure 8:
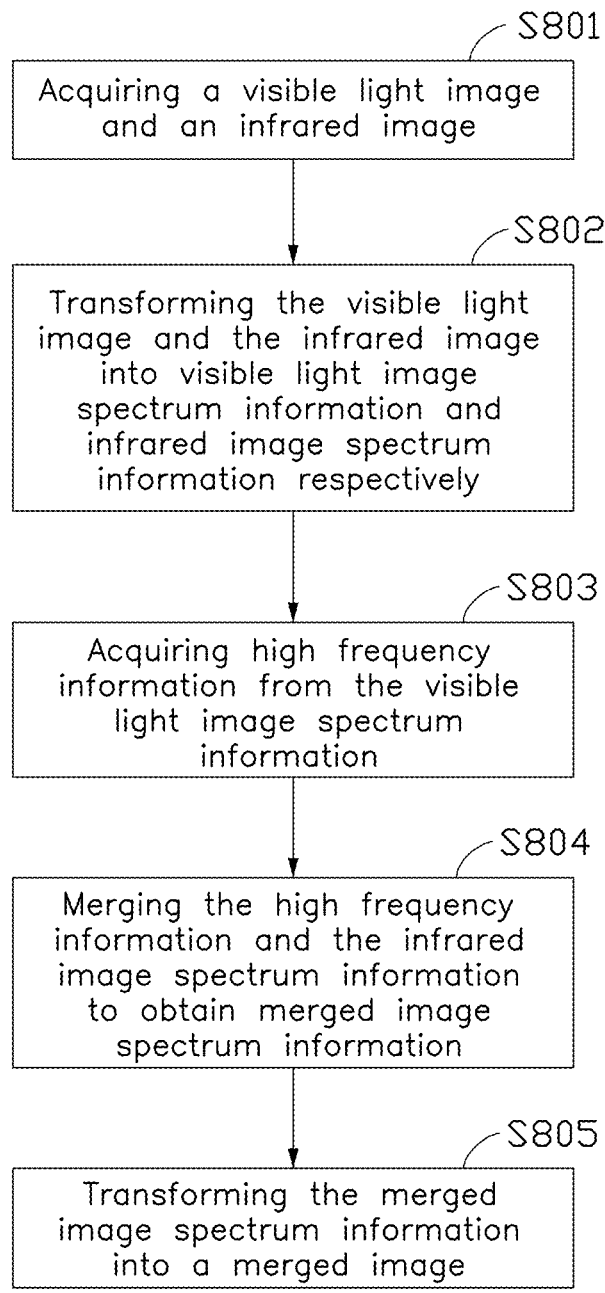
FIG. 8 is a flowchart illustrating a first embodiment of an imaging method according to the present application.

FIG. 8 shows a first embodiment of a flowchart of the imaging method. The imaging method is used in the imaging system 100, or the processor 130 of the imaging system 100.

Referring to FIG. 8, the imaging method may include at least the following steps, which also may be re-ordered.

In block S801, a visible light image and an infrared image are acquired.

In block S802, the visible light image and the infrared image are transformed into visible light image spectrum information and infrared image spectrum information respectively.

In block S803, high frequency information is acquired from the visible light image spectrum information.

In block S804, the high frequency information and the infrared image spectrum information are merged to obtain merged image spectrum information.

In block S805, the merged image spectrum information is transformed into a merged image.

The visible light image spectrum information corresponds to visible light information, the high frequency information in the visible light image spectrum information corresponds to detail features of the visible light information. The infrared image spectrum information corresponds to temperature information, the temperature information includes temperature distribution of the infrared image.

In one embodiment, the acquired visible light image and the infrared image are transformed into the visible light image spectrum information and the infrared image spectrum information, the high frequency information from the visible light image spectrum information is acquired, the high frequency information and the infrared image spectrum information are merged to generate the merged image spectrum information, lastly the merged image spectrum information is transformed into the merged image. Therefore, the merged image includes both the temperature distribution of the infrared image and the detail features of the visible light image, the temperature distribution of the infrared image is obtained by a low-cost thermal sensor with low-resolution ratio, the detail features of the visible light image are features in high-resolution ratio, which cause the merged image in a higher degree of recognition, it is benefit for satisfying the requirements in a low cost and a high resolution ration.

In one embodiment, the visible light image spectrum information and the infrared image spectrum information are frequency domain information, the merged image is spatial domain information.

In another embodiment, for transforming the acquired visible light image and the acquired infrared image into the visible light image spectrum information and the infrared image spectrum information respectively, by using Fourier Transform (FT), the visible light image and the infrared image are transformed into the frequency domain respectively to obtain the visible light image spectrum information and the infrared image spectrum information.

In another embodiment, for transforming the merged image spectrum information into the merged image, by using Inverse Fourier Transform (IFT), the merged image spectrum information in the frequency domain is transformed into the spatial domain to obtain the merged image.

In another embodiment, for acquiring the high frequency information from the visible light image spectrum information, the high frequency information is acquired from the visible light image spectrum information corresponding to a predefined frequency bandwidth.

In another embodiment, the imaging method also includes: enhancing the high frequency information.

In another embodiment, the imaging method also includes: pre-processing the acquired visible light image.

In another embodiment, the imaging method also includes: execute a perspective projecting transformation to the acquired infrared image.

Figure 9:
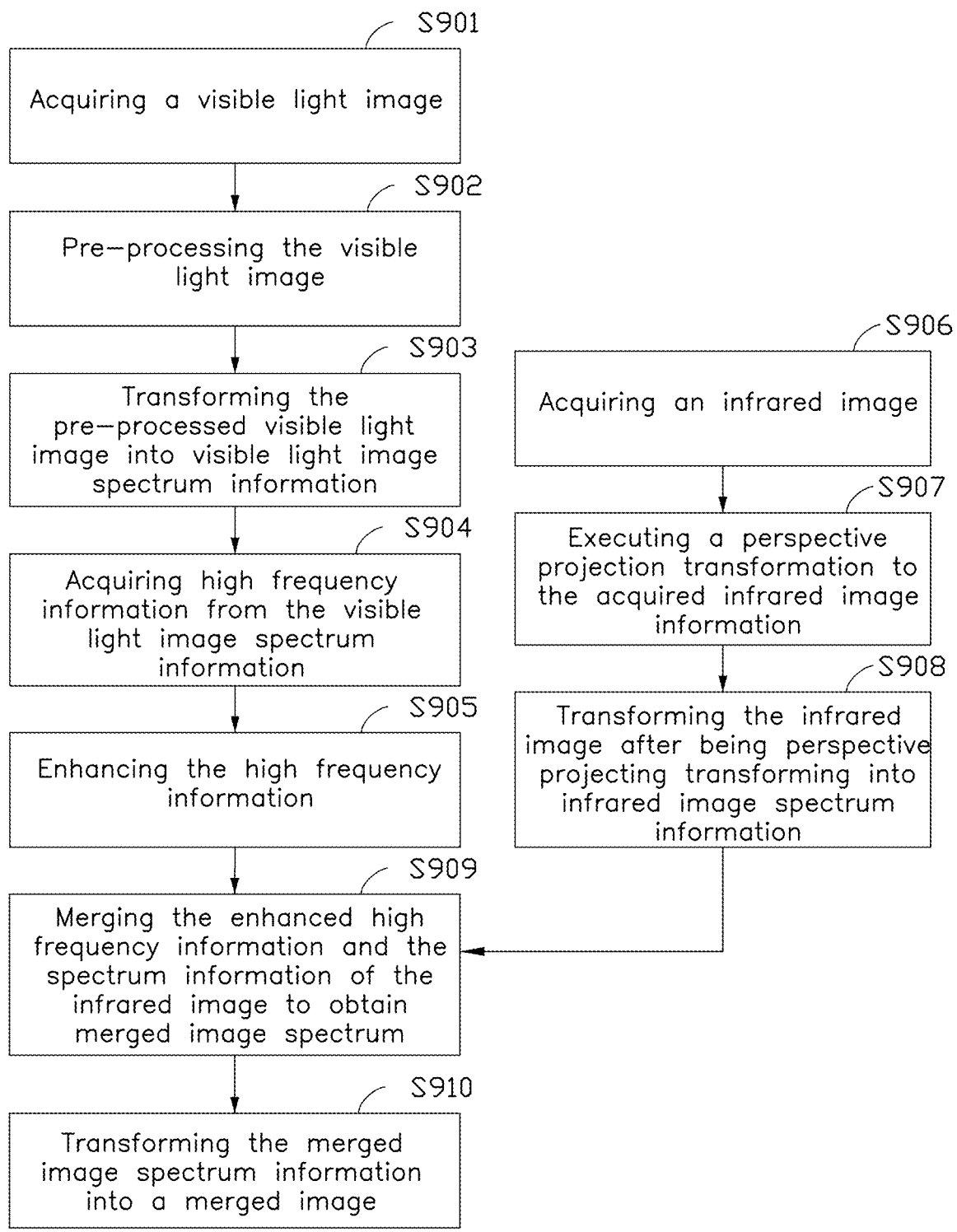
FIG. 9 is a flowchart illustrating a second embodiment of an imaging method according to the present application.

FIG. 9 shows a second embodiment of a flowchart of the imaging method. The imaging method is used in the imaging system 100, or the processor 130 of the imaging system 100.

Referring to FIG. 9, the imaging method may include at least the following steps, which also may be re-ordered.

In block S901, a visible light image is acquired.

In block S902, the visible light image is pre-processed. and the infrared image are transformed into and infrared image spectrum information respectively.

In block S903, the pre-processed visible light image is transformed into visible light image spectrum information.

In block S904, high frequency information is acquired from the visible light image spectrum information.

In block S905, the high frequency information is enhanced.

In block S906, an infrared image is acquired.

In block S907, a perspective projecting transformation is executed to the acquired infrared image.

In block S908, the infrared image after being perspective projecting transformed is transformed into infrared image spectrum information.

In block S909, the enhanced high frequency information and the infrared image spectrum information are merged to obtain merged image spectrum information.

In block S910, the merged image spectrum information is transformed into a merged image.

In one embodiment, by adjusting the pre-processing manner, the acquiring manner of the high frequency information, and the enhancing manner of the high frequency information, corresponding merged image spectrum information is obtained for generating the corresponding merged image.

In above embodiments, the acquired visible light image and the infrared image are transformed into the visible light image spectrum information and the infrared image spectrum information, the high frequency information from the visible light image spectrum information is acquired, the high frequency information and the infrared image spectrum information are merged to generate the merged image spectrum information, lastly the merged image spectrum information is transformed into the merged image. Therefore, the merged image includes both the temperature distribution of the infrared image and the detail features of the visible light image, the temperature distribution of the infrared image is obtained by a low-cost thermal sensor with low-resolution ratio, the detail features of the visible light image are features in high-resolution ratio, which cause the merged image in a higher degree of recognition, it is benefit for satisfying the requirements in a low cost and a high resolution ration.

The present discloses also provides a computer readable storage medium. The computer readable storage medium stores computer programs or codes, when being executed to perform the steps of the foregoing imaging method.

The computer storage medium includes volatile and non-volatile, removable, and non-removable media implemented in any method or technology for storing information such as computer readable instructions, data structures, program modules or other data. The computer storage medium includes, but is not limited, Random Access Memory (RAM), Read-Only Memory (ROM), Electrically Erasable Programmable Read-Only Memory (EEPROM), flash memory or other memory technologies, Compact Disc Read-Only Memory (CD-ROM), digital versatile disks (DVD) or other optical disk storages, magnetic cassettes, magnetic tapes, magnetic disk storages or other magnetic storage devices or any other media that may be used to store desired information and may be accessed by a computer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments.

What is claimed is:

1. An imaging system comprises:
a visible light image module, configured to generate a visible light image;
an infrared image module, configured to generate an infrared image; and
a processor, connected with the visible light image module and the infrared image module, and configured to implement following processes:
acquiring the visible light image and the infrared image;
transforming the visible light image and the infrared image into visible light image spectrum information and infrared image spectrum information respectively;
acquiring high frequency information from the visible light image spectrum information;
merging the high frequency information and the infrared image spectrum information to obtain merged image spectrum information; and
transforming the merged image spectrum information into a merged image;
wherein the infrared image spectrum information corresponds to temperature information, the temperature information comprises temperature distribution of the infrared image; the high frequency information corresponds to detail features of the visible light image; the infrared image spectrum information, the high frequency information, and the merged image spectrum information are frequency domain information, and the merged image is a spatial domain information, which can be transformed between each other using Fourier Transform.

2. The imaging system of claim 1, wherein the visible light image spectrum information and the infrared image spectrum information are frequency domain information, and the merged image is spatial domain information.

3. The imaging system of claim 1, transforming the visible light image and the infrared image into the visible light image spectrum information and the infrared image spectrum information respectively further comprising:
transforming the visible light image and the infrared image into a frequency domain respectively by using Fourier Transform to obtain the visible light image spectrum information and the infrared image spectrum information.

4. The imaging system of claim 1, transforming the merged image spectrum information into a merged image further comprising:
transforming the merged image spectrum information into a spatial domain by using Inverse Fourier Transform to obtain the merged image.

5. The imaging system of claim 1, acquiring the high frequency information from the visible light image spectrum information further comprising:
acquiring the high frequency information from the visible light image spectrum information corresponding to a predefined frequency bandwidth.

6. The imaging system of claim 5, wherein the processor further comprises a high-pass filter, and the high-pass filter is configured to acquire the high frequency information from the visible light image spectrum information corresponding to the predefined frequency bandwidth.

7. The imaging system of claim 1, wherein the processor further comprises an amplifier, and the amplifier is configured to enhance the high frequency information.

8. The imaging system of claim 1, wherein the processor further comprises a pre-processing module; the pre-processing module is connected with the visible light image module, and the pre-processing module is configured to receive the visible light image from the visible light image module and pre-process the received visible light image before transforming the visible light image into the visible light image spectrum information.

9. An imaging method for improving resolution ratio of images, being applicable in an imaging system; the imaging system is provided with a storage medium with computer instructions and a processor; and the processor executes the computer instructions to implement following processes:

acquiring a visible light image and an infrared image;

transforming the visible light image and the infrared image into visible light image spectrum information and infrared image spectrum information respectively;

acquiring high frequency information from the visible light image spectrum information;

merging the high frequency information and the infrared image spectrum information to obtain merged image spectrum information; and transforming the merged image spectrum information into a merged image;

wherein the infrared image spectrum information corresponds to temperature information, the temperature information comprises temperature distribution of the infrared image; the high frequency information corresponds to detail features of the visible light image; the infrared image spectrum information, the high frequency information, and the merged image spectrum information are frequency domain information, and the merged image is a spatial domain information, which can be transformed between each other using Fourier Transform.

10. The imaging method of claim 9, wherein the visible light image spectrum information and the infrared image spectrum information are frequency domain information, and the merged image is spatial domain information.

11. The imaging method of claim 9, wherein the processor is further configured to implement following processes:

transforming the visible light image and the infrared image into a frequency domain respectively by using Fourier Transform to obtain the visible light image spectrum information and the infrared image spectrum information.

12. The imaging method of claim 9, wherein the processor is further configured to implement following processes:

transforming the merged image spectrum information into a spatial domain by using Inverse Fourier Transform to obtain the merged image.

13. The imaging method of claim 9, wherein the processor is further configured to implement following processes:

acquiring the high frequency information from the visible light image spectrum information corresponding to a predefined frequency bandwidth.

14. The imaging method of claim 13, wherein the processor further comprises a high-pass filter, and the high-pass filter is configured to acquire the high frequency information from the visible light image spectrum information corresponding to the predefined frequency bandwidth.

15. The imaging method of claim 9, wherein the processor further comprises an amplifier, and the amplifier is configured to enhance the high frequency information.

16. The imaging method of claim 9, wherein the processor further comprises a pre-processing module; the pre-processing module is connected with the visible light image module, and the pre-processing module is configured to receive the visible light image from the visible light image module and pre-process the received visible light image before transforming the visible light image into the visible light image spectrum information.

17. A non-transitory computer readable storage medium, which stores computer programs, and the computer programs are executed by at least one processor to implement following processes:

acquiring a visible light image and an infrared image;

transforming the visible light image and the infrared image into visible light image spectrum information and infrared image spectrum information respectively;

acquiring high frequency information from the visible light image spectrum information;

merging the high frequency information and the infrared image spectrum information to obtain merged image spectrum information; and transforming the merged image spectrum information into a merged image;

wherein the infrared image spectrum information corresponds to temperature information, the temperature information comprises temperature distribution of the infrared image; the high frequency information corresponds to detail features of the visible light image; the infrared image spectrum information, the high frequency information, and the merged image spectrum information are frequency domain information, and the merged image is a spatial domain information, which can be transformed between each other using Fourier Transform.

18. The non-transitory computer readable storage medium of claim 17, wherein the visible light image spectrum information and the infrared image spectrum information are frequency domain information, and the merged image is spatial domain information.

19. The non-transitory computer readable storage medium of claim 17, wherein acquiring the high frequency information from the visible light image spectrum information further comprising:

acquiring the high frequency information from the visible light image spectrum information corresponding to a predefined frequency bandwidth.

20. The non-transitory computer readable storage medium of claim 17, wherein the computer programs further implement following processes:

receiving the visible light image from a visible light image module, and pre-processing the received visible light image before transforming the visible light image into the visible light image spectrum information.

* * * * *